US008036876B2

(12) United States Patent
Sanfilippo et al.

(10) Patent No.: US 8,036,876 B2
(45) Date of Patent: Oct. 11, 2011

(54) METHODS OF DEFINING ONTOLOGIES, WORD DISAMBIGUATION METHODS, COMPUTER SYSTEMS, AND ARTICLES OF MANUFACTURE

(75) Inventors: Antonio P. Sanfilippo, Richland, WA (US); Stephen C. Tratz, Richland, WA (US); Michelle L. Gregory, Richland, WA (US); Alan R. Chappell, Seattle, WA (US); Paul D. Whitney, Richland, WA (US); Christian Posse, Seattle, WA (US); Robert L. Baddeley, Richland, WA (US); Ryan E. Hohimer, West Richland, WA (US)

(73) Assignee: Battelle Memorial Institute, Richland, WA (US)

( * ) Notice: Subject to any disclaimer, the term of this patent is extended or adjusted under 35 U.S.C. 154(b) by 1706 days.

(21) Appl. No.: 11/267,370

(22) Filed: Nov. 4, 2005

(65) Prior Publication Data

US 2007/0106493 A1    May 10, 2007

(51) Int. Cl.
*G06F 17/28*    (2006.01)
*G06F 17/21*    (2006.01)

(52) U.S. Cl. .................................. 704/9; 704/7; 704/10

(58) Field of Classification Search .................. 704/3, 4, 704/7, 9, 10; 706/60; 715/260; 707/707
See application file for complete search history.

(56) References Cited

U.S. PATENT DOCUMENTS

| 5,794,050 | A  | * | 8/1998  | Dahlgren et al. | 717/144 |
| 6,260,008 | B1 | * | 7/2001  | Sanfilippo | 704/9 |
| 6,446,061 | B1 | * | 9/2002  | Doerre et al. | 707/3 |
| 6,871,174 | B1 | * | 3/2005  | Dolan et al. | 704/9 |
| 7,272,597 | B2 | * | 9/2007  | Chowdhury et al. | 1/1 |
| 7,526,425 | B2 | * | 4/2009  | Marchisio et al. | 704/9 |
| 7,752,243 | B2 | * | 7/2010  | Hoeber et al. | 707/765 |
| 2002/0059289 | A1 | * | 5/2002  | Wenegrat et al. | 707/102 |
| 2003/0018626 | A1 | * | 1/2003  | Kay et al. | 707/3 |
| 2003/0061028 | A1 | * | 3/2003  | Dey et al. | 704/9 |
| 2003/0084066 | A1 | * | 5/2003  | Waterman et al. | 707/104.1 |
| 2003/0217335 | A1 | * | 11/2003 | Chung et al. | 715/514 |
| 2004/0054672 | A1 | * | 3/2004  | Tsuchitani et al. | 707/3 |
| 2004/0153311 | A1 | * | 8/2004  | Liu et al. | 704/10 |

(Continued)

OTHER PUBLICATIONS

Mark Stevenson, "Combining Disambiguation Techniques to Enrich an Ontology," Machine Learning and Natural Language Processing for Ontology Engineering, ECAI'02, Lyon (France), Jul. 22-23, 2002.*

(Continued)

*Primary Examiner* — James S. Wozniak
*Assistant Examiner* — Edgar Guerra-Erazo
(74) *Attorney, Agent, or Firm* — Wells St. John, P.S.

(57) ABSTRACT

Methods of defining ontologies, word disambiguation methods, computer systems, and articles of manufacture are described according to some aspects. In one aspect, a word disambiguation method includes accessing textual content to be disambiguated, wherein the textual content comprises a plurality of words individually comprising a plurality of word senses, for an individual word of the textual content, identifying one of the word senses of the word as indicative of the meaning of the word in the textual content, for the individual word, selecting one of a plurality of event classes of a lexical database ontology using the identified word sense of the individual word, and for the individual word, associating the selected one of the event classes with the textual content to provide disambiguation of a meaning of the individual word in the textual content.

18 Claims, 4 Drawing Sheets

U.S. PATENT DOCUMENTS

| | | | |
|---|---|---|---|
| 2005/0165600 A1* | 7/2005 | Kasravi et al. ............... | 704/9 |
| 2005/0198026 A1* | 9/2005 | Dehlinger et al. ............ | 707/5 |
| 2006/0074632 A1* | 4/2006 | Nanavati et al. ............. | 704/9 |
| 2006/0155693 A1* | 7/2006 | Chowdhury et al. ......... | 707/4 |
| 2007/0106499 A1* | 5/2007 | Dahlgren et al. ............ | 704/10 |

OTHER PUBLICATIONS

R.Benassi S.Bergamaschi, and M.Vincini, "TUCUXI: The InTelligent Hunter Agent for Concept Understanding and LeXical Chaining", IEEE/WIC/ACM Web Intelligence International Conference, Beijing, China 2004, pp. 249-255.*

Y. Li, Zuhair A. Bandar, D. M. 2003. An approch for measuring semantic similarity between words using multiple information sources. IEEE Transactions on Knowledge and Data Engineering 15(4), 871-882.*

Sundblad, H., Automatic Acquisition of Hyponyms and Meronyms from Question Corpora, Proceedings of the ECAI 2002 Workshop on Machine Learning and Natural Language Processing for Ontology Engineering (OLT'2002), Lyon, France, 2002.*

Sanfilippo, A. (1994). "Word knowledge acquisition, lexicon construction and dictionary compilation." In Proceedings of the 15th International Conference of Computational Linguistics. COLING-94, vol. I, pp. 273-277.*

M. Shamsfard and A. Barforoush, The state of the art in ontology learning: a framework for comparison, Knowledge Engineering Review 18 (4): 293-316.*

Montoyo et al., "Word sense disambiguation with specification marks in unrestricted texts", Database and Expert Systems Applications, 2000 in Proceedings 11th International Workshop on, Sep. 200, pp. 103-107.*

Latifur R Khan, "Ontology-based Information Selection", A Dissertation Presented to the Faculty of the Graduate School University of Southern California in Partial Fulfillment of the Requirements for the Degree Doctor of Philosophy, Computer Science, Aug. 2000.*

EIC_Search_report_NPL.*

Buitelaar, P. and T. Declerck. Linguistic Annotation for the Semantic Web. In S. Handschuh, S. Staab, "Annotation for the Semantic Web," IOS Press, 2003.*

Vossen P., "EuroWordNet General Document", Jul. 1, 2002.*

Maedche et al., (2001), "Ontology Learning for the Semantic Web," IEEE Intelligent Systems 16(2), 72-79.*

Yoshinaga K et al: "Multi-lingual intelligent information retriever with automated ontology generator" Knowledge-Based Intelligent Information Engineering Systems, 1999. Third International Conference Adelaide, SA, Australia Aug. 31- Sep. 1999, Piscataway, N J, USA, IEEE, US, Aug. 31, 1999, pp. 62-65.*

Buitelaar, P. and T. Declerck. Linguistic Annotation for the Semantic Web. In S. Handschuh, S. Staab, "Annotation for the Semantic Web," IOS Press, 2003.*

Maedche et al., (2001), "Ontology Learning for the Semantic Web," IEEE Intelligent Systems 16(2), 72-79.*

Yoshinaga K et al: "Multi-lingual intelligent information retriever with automated ontology generator" Knowledge-Based Intelligent Information Engineering Systems, 1999. Third International Conference Adelaide, SA, Australia Aug. 31- Sep. 1999, Piscataway, N J, USA, IEEE, US, Aug. 31, 1999, pp. 62-65.*

Snyder, B. and M. Palmer; The English all-words task. SENSEVAL-3: 3rd Int'l Workshop on the Evaluation of Systems for the Semantic Analysis of Text; Barcelona, SP; Jul. 2004; 3pp.

Automatic Semantic Annotation using Unsupervised Information Extraction and Integration; Dingli et al.; 2000; UK Engineering and Physical Sciences Research Council; 8pp.

AeroDAML: Applying Information Extraction to Generate DAML Annotations from Web Pages; Kogut et al.; Air Force Research Laboratory; Oct. 21, 2001; 3 pp.

Automated OWL Annotation Assisted by a Large Knowledge Base; Witbrock et al.; 3rd International Semantic Web Conference; Japan; 2004; 8 pp.

Designing Adaptive Information Extraction for the Semantic Web in Amilcare; Ciravengna et al.; UK Engineering and Physical Sciences Research Council; 2003; pp. 1-16.

Linguistic Annotation for the Semantic Web; Buitelaar et al.; DFKI GmbH, Language Technology Dept.; 2003; pp. 1-19.

Machine Learning in Automated Text Categorization; F. Sebastiani; ACM Computing Surveys, vol. 34, No. 1, Mar. 2002; pp. 1-47.

Berger, A., S. Della Pietra and V. Della Pietra (1996) A Maxiumum Entrophy Approach to Natural Language Processing. Computational Linguistics, vol. 2, No. 1, pp. 1-36.

Dang, H.T. et al.; The Role of Semantic Roles in Disambiguating Verb Senses. Proc of the 43rd Annual Meeting of the Assoc for Computational Linguistics, Ann Arbor, MI; Jun. 2005; pp. 42-49.

Decadt, B. et al.; GAMBL, Genetic Algorithm Optimization of Memory-based WSD. SENSEVAL-3: 3rd Int'l Workshop on the Evaluation Systems for the Semantic Analysis of Text; Jul. 2004; 5 pp.

Forman, G. (2003) An Extensive Empirical Study of Feature Selection Metrics for Text Classification, Journal of Machine Learning Research, 3, pp. 1289-1305 & A1-A9.

Hovy, E.; Combining and Standardizing Large-Scale, Practical Ontologies for Machine Translation and Other Uses. Proc. of the Int'l Conf. on Language Resources Evaluation 1998: 8 pp.

Knight, K. and S. K. Luk. 1994. Building a Large-Scale Knowledge Base for Machine Translation. Proceedings of the AAAI Conference; 6 pp.

Kohomban, U. et al. (2005) Learning Semantic Classes for Word Sense Disambiguation; Proc of the 43rd Annual Meeting of the Assoc for Computational Linguistics; Ann Arbor, MI 8 pp.

Mihalcea, R. et al.; SenseLearner: Minimally supervised word sense disambiguation for all words in open text. SENSEVAL-3: 3rd Int'l Workshop on the Evaluation of Systems for the Semantic Analysis of Text; Jul. 2004; 4 pp.

Niles, I. et al.; Linking Lexicons and Ontologies: Mapping WordNet to the Suggested Upper Merged Ontology.; 2003; pp. 1-7.

O'Hara, Tom, et al.; Inducing criteria for mass noun lexical mappings using the Cyc KB and its Extension to WordNet. In Proc of 5th Int'l Workshop on Computational Semantics; 2003; pp. 1-14.

Pedersen, T., et al.; Maximizing Semantic Relatedness to Perform Word Sense Disambiguation. Univ. of Minnesota Supercomputing Institute Research Report UMSI Mar. 25, 2005; pp. 1-34.

WordNet-Princeton University Cognitive Science Laboratory; http://cogsci.princeton.edu/; 2006; 1 p.

Resnik, P. (1995) Using Information Content to Evaluate Semantic Similarity in a Taxonomy; Proc of the 14th Int'l Joint Conf on Artificer Intelligence; vol. 1; pp. 448-453.

OWL Web Ontology Language Reference; http:/www.w3.org/TR/owl-ref; Feb. 10, 2004; 58 pp.

The Protege Ontology Editor and Knowledge Acquisitions System; http://protege.stanford.edu; 2005; 2 pp.

Jena—A Semantic Web Framework for Java; http://jena.sourceforge.net/index.html; 2000; 2 pp.

Rada Mihalcea Downloads; http://www.cs.unt.edu/~rada/downloads.html; 2005; 3 pp.

Gangemi, A., Guarino, N., Masolo, C. Oltramari, A.; Sweetening WordNet with DOLCE; AI Magazine; Fall 2003, pp. 13-24.

Sanfilippo, A., et al.; Building a Human Information Discourse Interface to Uncover Scenario Content; In Proc. To the 2005 Int'l Conf on Intelligence Analysis; May 2005; 6 pp.

Yang, Y., and J.O. Pedersen (1997) A Comparative Study on Feature Selection in Text Categorization; In Proceedings of the 14th International Confrence on Machine; pp. 412-420.

Yarosky, D. (1992) Word-sense Disambiguation Using Statistical Models of Roget's Categories Trained on Large Corpora; In Proceedings of COLING-92; pp. 1-11.

Broekstra, J., et al.; An Architecture for Storing and Querying RDF Data and Schema Information; Spinning the Semantic Web; MIT Press; 2003; pp. 1-16.

The OpenNLP Maxent Homepage; http://maxent.sourceforge.net; Oct. 15, 2005; 1 p.

LCC's Cicero Lite; http://www.languagecomputer.com/solutions/information_extraction/cicero_lite; Jul. 21, 2005; 2 pp.

Connexor natural knowledge; www.connexor.com; 2003; 2 pp.

Tapanainen, P. and Timo Järvinen; A Nonprojective Dependency Parser; In Proc. of the 5th Conference on Applied Natural Language Processing; 1997; Washington D.C.; pp. 64-71.

"Ontological Annotation"; Sanfilippo et al.; May 1, 2005; 1 p.
"Ontological Annotation with WordNet"; Sanfilippo et al.; 5th Int'l Workshop on Knowledge Markup and Semantic Annotation; Nov. 7, 2005; pp. 27-36.
Partial International Search Report for PCT/US2006/037975; mailed Sep. 17, 2007; 4 pp.
International Search Report for PCT/US2006/037975; mailed Dec. 27, 2007; 6 pp.
Written Opinion for PCT/US2006/037975; mailed Dec. 27, 2007; 11 pp.
The Role of Domain Information in Word Sense Disambiguation; Magnini et al.; May 18, 2005; Cambridge University Press; Natural Language Engineering; pp. 1-14.
Using Domain Information for Word Sense Disambiguation; Magnini et al.; Int'l Workshop on Evaluating Word Sense Disambiguation Systems; Jul. 6, 2004; 4 pp.
Word Domain Disabiguation via Word Sense Disambiguation; Sanfilippo et al.; Proc. of the Human Language Tech. Conf. of the North American Chp. of the ACL; Jun. 4, 2006; pp. 141-144.
OpenCyc.org; www.opencyc.org; 1995; 3 pp.
CPAN; http://search.cpan.org/dist/WordNet-Similarity/utils/BNCFreq.pl; 2005 3 pp.
"Towards a Standard Upper Ontology"; Niles et al.; FOIS-2001; Oct. 17-19, 2001; 8 pp.
"The English All-Words Task. SENSEVAL-3"; Snyder et al.; 2004; 3 pp.
"Sweetening WordNet with DOLCE"; Gangemi et al.; AI Magazine 24(3); Fall 2003; pp. 13-24.
"Sweetening Ontologies with DOLCE"; Gangemi et al.; EKAW 2002; Oct. 1-4, 2002; 16 pp.

* cited by examiner

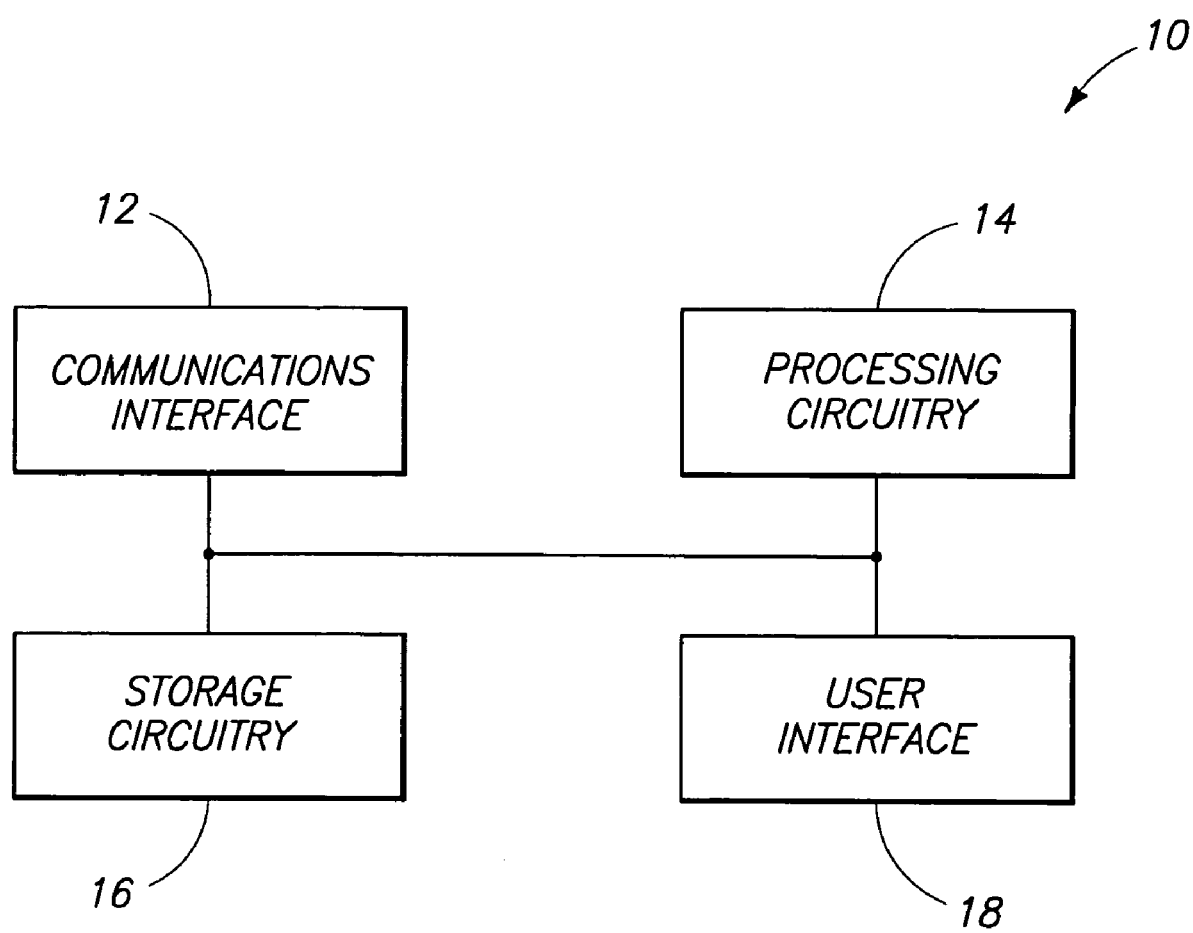
F I G. 1

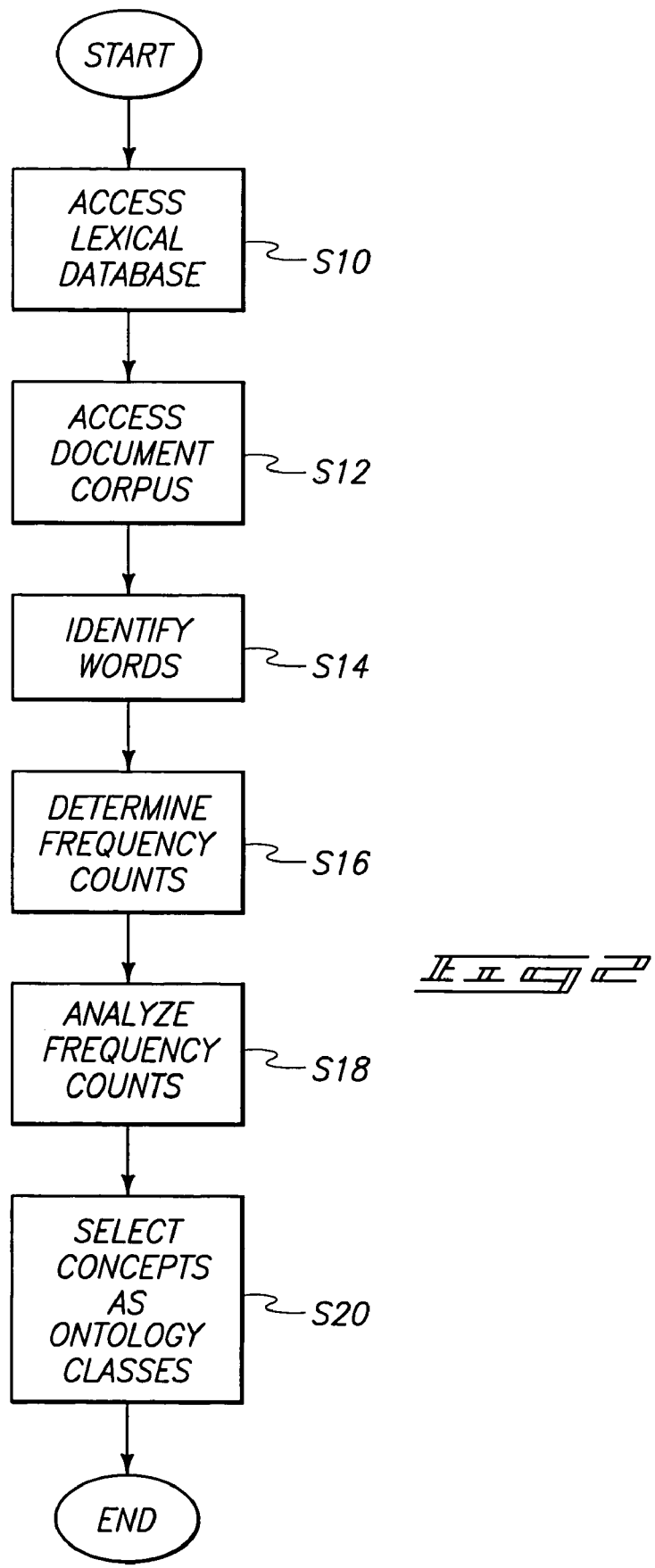

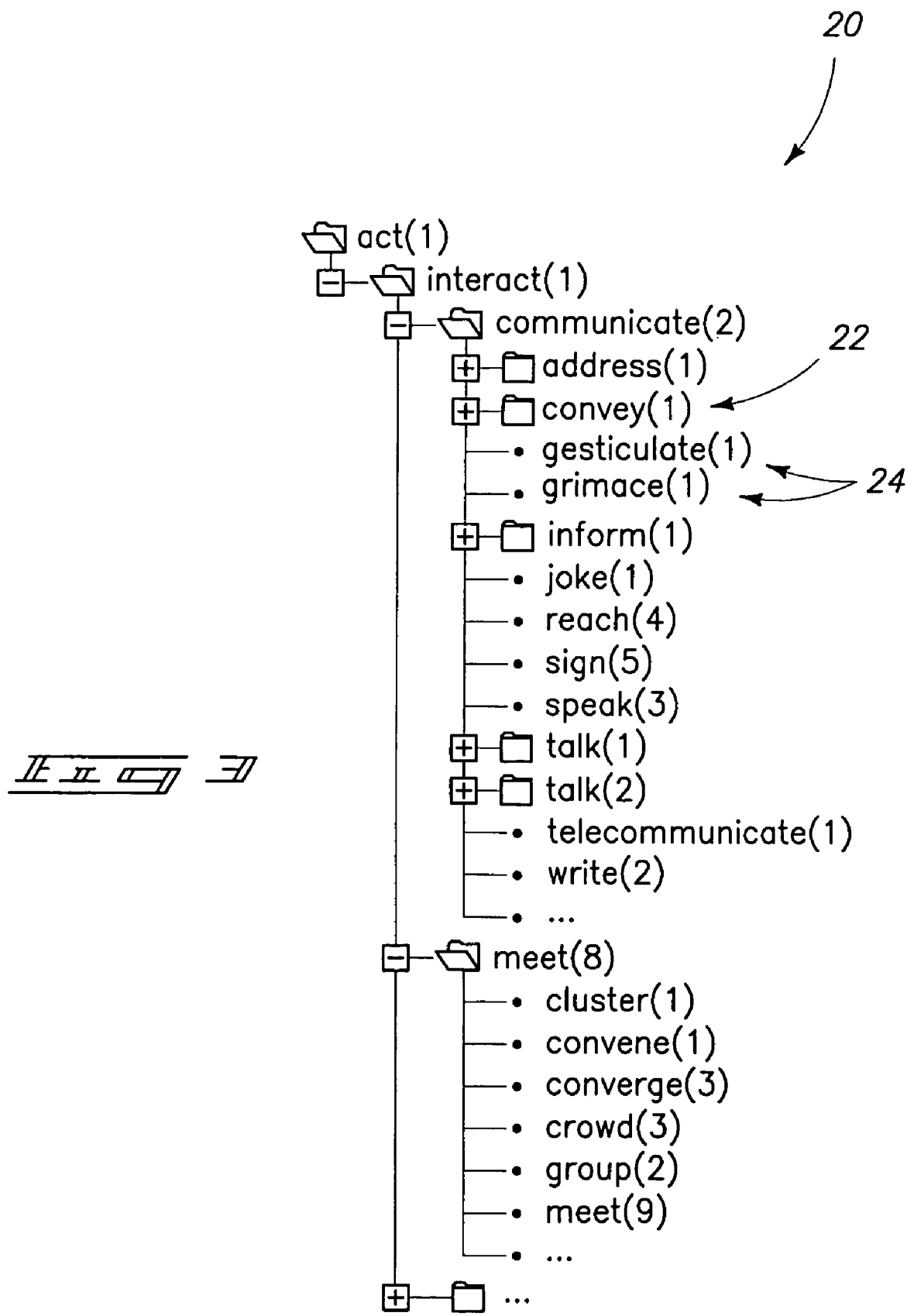

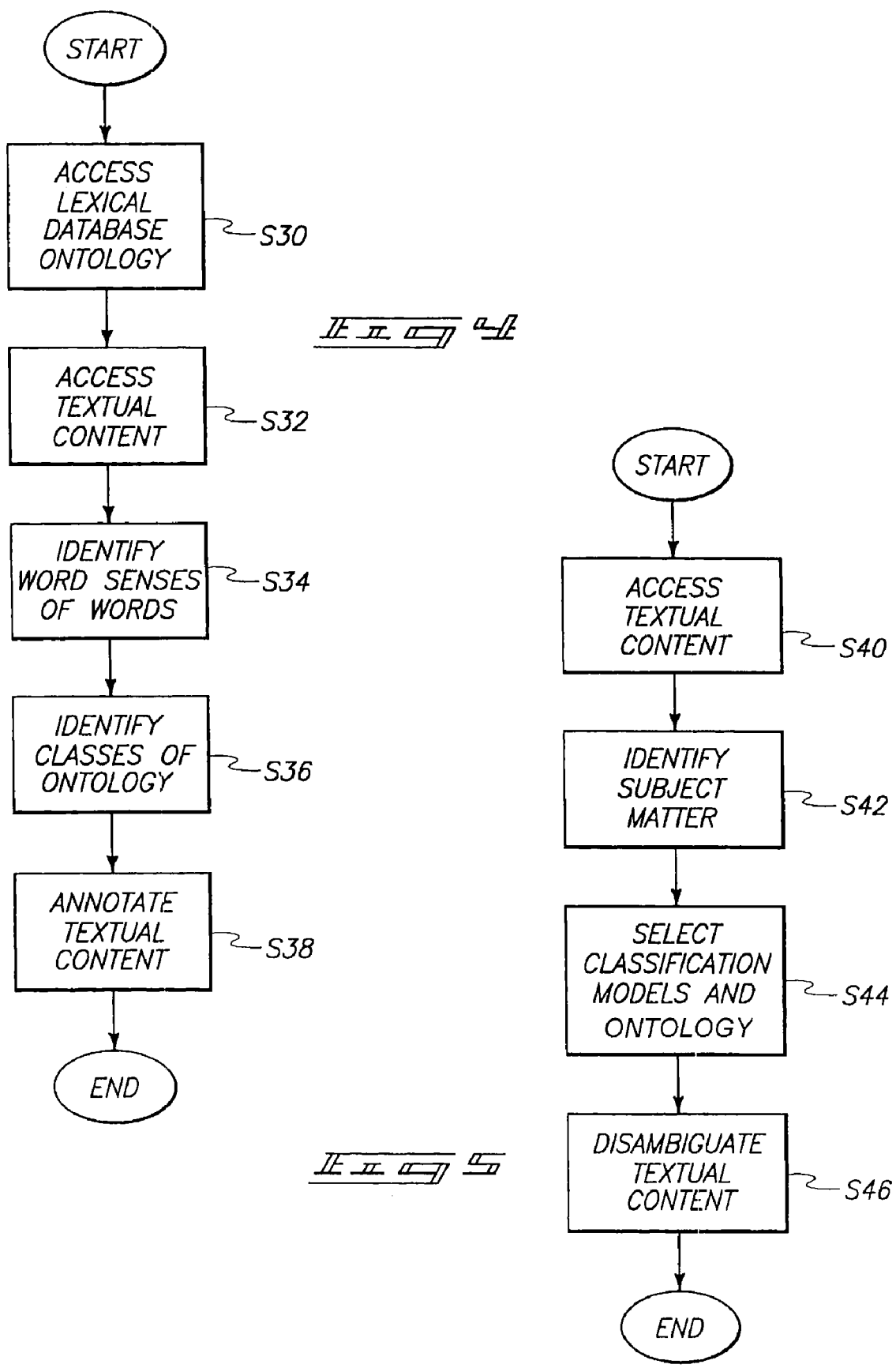

METHODS OF DEFINING ONTOLOGIES, WORD DISAMBIGUATION METHODS, COMPUTER SYSTEMS, AND ARTICLES OF MANUFACTURE

GOVERNMENT RIGHTS STATEMENT

This invention was made with Government support under Contract DE-AC0676RLO1830 awarded by the U.S. Department of Energy. The Government has certain rights in the invention.

TECHNICAL FIELD

This invention relates to methods of defining ontologies, word disambiguation methods, computer systems, and articles of manufacture.

BACKGROUND

Collection, integration and analysis of large quantities of data are routinely performed by intelligence analysts and other entities. Vast numbers of different types of communications (e.g., documents, electronic mail, etc.) may be analyzed and perhaps associated with one another in an attempt to gain information or insight which is not readily comprehensible from the communications taken individually. Various analyst tools process communications in attempts to generate, identify, and investigate hypotheses. However, many words present in the documents may have a plurality of senses or different meanings which may lead to unacceptable processing of the documents. At least some aspects of the present disclosure are directed towards apparatus and methods of disambiguating the meaning of words occurring in text to facilitate analysis of the documents.

BRIEF DESCRIPTION OF THE DRAWINGS

Preferred embodiments of the invention are described below with reference to the following accompanying drawings.

FIG. 1 is a functional block diagram of a computing system according to one embodiment.

FIG. 2 is a flow chart of a method of defining a lexical database ontology according to one embodiment.

FIG. 3 is an illustrative representation of a fragment of a lexical database ontology according to one embodiment.

FIG. 4 is a flow chart of a method of disambiguating textual content according to one embodiment.

FIG. 5 is a flow chart of a method of disambiguating textual content according to one embodiment.

DETAILED DESCRIPTION

At least some aspects of the disclosure relate to apparatus and/or methods of defining a lexical database ontology. The lexical database ontology may be used in textual analysis to disambiguate textual content being analyzed.

Additional aspects of the disclosure provide apparatus and/or methods of disambiguating textual content. One disambiguation embodiment utilizes a lexical database ontology. Another disambiguation embodiment discloses selection of certain classification models and/or ontologies corresponding to subject matter of the textual content being analyzed. In one embodiment, the textual content may be annotated with disambiguated meanings of the textual content resulting from analysis. The disambiguation may facilitate additional analysis of the textual content, for example, in analysis including artificial intelligence. Additional embodiments are described below.

FIG. 1 illustrates an exemplary computing system 10 according to one embodiment. Computing system 10 may be configured to implement aspects of the disclosure including defining one or more lexical database ontologies and/or disambiguating textual content.

Computing system 10 may be implemented in exemplary embodiments using any appropriate processing device, such as a personal computer, workstation, server, etc. The exemplary depicted computing system 10 includes a communications interface 12, processing circuitry 14, storage circuitry 16 and a user interface 18 according to one embodiment. Other embodiments are possible including more, less and/or alternative structure. Further, additional computing systems 10 may be utilized in other embodiments. For example, one computing system 10 may be configured to define a lexical database ontology while one or more other systems 10 may be configured to disambiguate textual content (e.g., which may include using a lexical database ontology determined by another device) in one exemplary embodiment.

Communications interface 12 is arranged to implement communications of computing system 10 with respect to external devices (not shown). For example, communications interface 12 may be arranged to communicate information bi-directionally with respect to computing system 10. Communications interface 12 may be implemented as a network interface card (NIC), serial or parallel connection, USB port, Firewire interface, flash memory interface, floppy disk drive, or any other suitable arrangement for communicating with respect to computing system 10.

In one embodiment, processing circuitry 14 is arranged to process data, control data access and storage, issue commands, and control other desired operations. Processing circuitry 14 may comprise circuitry configured to implement desired programming provided by appropriate media in at least one embodiment. For example, the processing circuitry 14 may be implemented as one or more of a processor and/or other structure configured to execute executable instructions including, for example, software and/or firmware instructions, and/or hardware circuitry. Exemplary embodiments of processing circuitry 14 include hardware logic, PGA, FPGA, ASIC, state machines, and/or other structures alone or in combination with a processor. These examples of processing circuitry 14 are for illustration and other configurations are possible.

The storage circuitry 16 is configured to store programming such as executable code or instructions (e.g., software and/or firmware), electronic data, databases, and/or other digital information and may include processor-usable media. Processor-usable media may be embodied in any computer program product or article of manufacture which can contain, store, or maintain programming, data and/or digital information for use by or in connection with an instruction execution system including processing circuitry 14 in the exemplary embodiment. For example, exemplary processor-usable media may include any one of physical media such as electronic, magnetic, optical, electromagnetic, infrared or semiconductor media. Some more specific examples of processor-usable media include, but are not limited to, a portable magnetic computer diskette, such as a floppy diskette, zip disk, hard drive, random access memory, read only memory, flash memory, cache memory, and/or other configurations capable of storing programming, data, or other digital information.

At least some embodiments or aspects described herein may be implemented using programming stored within appropriate storage circuitry 16 described above and/or communicated via a network or other transmission media and configured to control appropriate processing circuitry. For example, programming may be provided via appropriate media including for example embodied within articles of manufacture, embodied within a data signal (e.g., modulated carrier wave, data packets, digital representations, etc.) communicated via an appropriate transmission medium, such as a communication network (e.g., the Internet and/or a private network), wired electrical connection, optical connection and/or electromagnetic energy, for example, via a communications interface, or provided using other appropriate communication structure or medium. Exemplary programming including processor-usable code may be communicated as a data signal embodied in a carrier wave in but one example.

User interface 18 is configured to interact with a user including conveying data to a user (e.g., displaying data for observation by the user, audibly communicating data to a user, etc.) as well as receiving inputs from the user (e.g., tactile input, voice instruction, etc.). Accordingly, in one exemplary embodiment, the user interface 18 may include a display (e.g., cathode ray tube, LCD, etc.) configured to depict visual information and an audio system as well as a keyboard, mouse and/or other input device. Any other suitable apparatus for interacting with a user may also be utilized.

Referring to FIG. 2, a method of defining event classes of a lexical database ontology is shown according to one embodiment. The method is described with respect to verbs although the method may be executed to define event classes of lexical database ontologies for nouns, adjectives, adverbs, etc. The method of FIG. 2 may be implemented using processing circuitry 14 of computing system 10 in one implementation. Other methods are possible including more, less and/or alternative steps.

At a step S10, a lexical database is accessed. In one embodiment, the lexical database which is accessed may be useful to facilitate generation of an ontology. For example, in exemplary embodiments, the lexical database may include a lexical hierarchy wherein words are arranged by synonyms, hypernyms, hyponyms, and/or troponyms in illustrative arrangement examples. Words may refer to entire words or lemmas of the words. An example of a lexical database which may be used is WordNet 2.0 available at http://wordnet.princeton.edu, the teachings of which are incorporated herein by reference. Other lexical databases may be used in other embodiments.

A lexical database, such as WordNet 2.0, may include a plurality of different concepts. The concepts may be constructed as a plurality of synonym sets associated with respective ones of the concepts. For example, WordNet 2.0 includes approximately 13,500 concepts or synonym sets for verbs. Concepts or synonym sets are also present in WordNet 2.0 for nouns, adjectives, adverbs, etc. The concepts or synonym sets may individually include a plurality of words. For example, in WordNet 2.0, a plurality of lemmas of synonyms and the senses thereof are associated with individual ones of the concepts and form synonym sets.

At a step S12, a document corpus is accessed to assist with defining a lexical database ontology. An exemplary corpus which may be used is the British National Corpus. Other textual content may be used in other embodiments.

At a step S14, words present in the documents of the corpus are identified. In one embodiment, occurrences of lemmas present in the documents of the corpus are identified to provide the identification of the words.

At a step S16, a plurality of frequency counts indicative of the number of occurrences of the concepts in the documents of the corpus are counted or determined. As mentioned above, in one embodiment, the British National Corpus may be used. Words of the documents of the British National Corpus are not annotated with WordNet word senses. Accordingly, concept counts may be distributed across all possible senses of a word or lemma in one embodiment. In one embodiment, the number of times a lemma occurs in the corpus is determined and the frequency counts of the concepts which include a sense or hypernym of the respective lemma are incremented according to the number of occurrences of the lemma in the corpus. In one embodiment, the frequency count of each concept including a sense of the word lemma may be increased by a measure. The measure may be calculated to be the same for all of the concepts which include a sense of the word lemma and wherein the sum of the measures for the concepts being incremented equal one (e.g., increase each concept by ½ if two concepts include a sense of the word lemma, increase each concept by ⅓ if three concepts include a sense of the word lemma, etc.). For example, if there are two senses of a lemma, then each of the frequency counts of the concepts including one of the senses is updated by 0.5 when the lemma is observed to occur within the corpus. In addition, the frequency count of a concept which is a hypernym of the concept(s) which are increased as a result of including a sense of the word lemma may also be increased by the same measure (e.g., ½, ⅓, etc.). If the words of the corpus are annotated with senses, the frequency counts of the respective concepts which include the words and appropriate senses are incremented when the words and respective senses are observed in the corpus. Other methods of determining frequency counts may be used in other embodiments.

At a step S18, the frequency counts are analyzed. For example, the frequency counts may be compared with a threshold to identify the most frequently occurring concepts present in the documents of the corpus. The most frequently occurring concepts may be chosen as event classes in one embodiment. In an example wherein the British National Corpus is used, frequency counts for verb concepts or synonym sets of WordNet 2.0 ranged from 0 to 2,060,415. In one embodiment, an exemplary frequency cut-off value may be selected as a threshold for selecting the verb concepts as verb event classes. A threshold value of 10,000 was selected in one embodiment and resulted in 1077 verb event classes out of a total of 24,632 verb concepts or synonym sets using the British National Corpus and WordNet 2.0.

At a step S20, the concepts whose frequency counts exceed the threshold are selected as event classes of a lexical database ontology.

Additional details regarding analysis of a corpus of documents to extract WordNet concept frequencies are discussed in Resnik, P. (1995) *Using Information Content To Evaluate Semantic Similarity in a Taxonomy*, Proceedings of the 14$^{th}$ International Joint Conference on Artificial Intelligence, Vol. 1, 448-453, Montreal, August 1995; Pedersen, T., S. Banerjee and S. Patwardhan *Maximizing Semantic Relatedness to Perform Word Sense Disambiguation*, University of Minnesota Supercomputing Institute Research Report UMSI Mar. 25, 2005 (available at http://www.msi.umn.edu/general/Reports/rptfiles/2005-25.pdf); and http://search.cpan.org/dist/WordNetSimilarity/utils/BNCFreq.pl, the teachings of which are incorporated herein by reference.

In one embodiment, the above exemplary procedure may select concepts as event classes that are less specific in meaning (e.g., selection of a general concept or verb synonym set {communicate#2, intercommunicate#2} versus selection of a more specific concept {gesticulate#1, gesture#1, motion#1}). As used herein, the numbers following a word or lemma indicate the sense of the word or lemma.

Other and/or additional criteria may be used in one embodiment to identify concepts or synonym sets as event classes. For example, in one embodiment, an exemplary criterion in addition to the above-recited method for identifying classes may be imposed that concepts which are selected as event classes include hyponyms in the lexical database being utilized. Other criteria are possible for selecting concepts.

In one example, 386 top-level verb synonym sets had no hyponyms or were below the frequency cut-off value. Some of the verb synonym sets which did not meet the criteria to become event classes may be mapped to other verb synonym sets using a "similar sense" function of WordNet 2.0 while the remaining synonym sets may pertain to relatively rare or more specific concepts, have very few or no hyponyms and may not be well suited as ontology classes.

Once a given concept is selected as an event class of the ontology, one embodiment of the disclosure provides a method to select the name of the event class. In one example, the lemma of the concept or synonym set which was found to be most frequently occurring from the analysis of the corpus compared to other lemmas of the concept may be selected as the name of the concept or synonym set. For example, for the concept or verb synonym set {communicate#2, intercommunicate#2}, the more frequently occurring lemma and sense "communicate#2" may be selected to name the concept responsive to it being more frequently occurring in the British National Corpus compared with "intercommunicate #2."

Following the identification of an event class of the ontology, instances of the identified event class may be determined. In one example, the lemmas (and senses) of the concept or synonym set may be selected as instances (e.g., communicate#2 and intercommunicate#2) of the concept "communicate#2". In addition, the troponyms (e.g., gesticulate#1, gesture#1, motion#1 of communicate#2; and grimace#1, make_a_face#1, pull_a_face#1 of intercommunicate#2) and hyponyms of the lemmas may also be selected as instances of the event class. Other methods may be used to select the instances in other embodiments.

In one example, the event classes and instances of the ontology may be developed using an OWL (Web Ontology Language) ontology described at http://www.w3.org/TR/owl-ref using Protégé described at http://protege.stanford.edu as an ontology editor environment and Jena described at http://jena.sourceforge.net as a semantic web framework in which to implement the ontology, handle reification, issue queries, and perform logical inference. The teachings of the references cited in this paragraph are incorporated by reference.

As mentioned above, lexical database ontologies may be generated for nouns, adjectives, adverbs, etc. using the method of FIG. 2. With respect to nouns, the method of FIG. 2 may be repeated using the British National Corpus. A noun ontology of 3005 concepts was defined for a frequency threshold of 6100 in one exemplary embodiment.

Referring to FIG. 3, a verb fragment 20 of an exemplary lexical database ontology is illustrated according to one embodiment. The fragment 20 discloses a hierarchy including a plurality of event classes (represented by folder icons) and instances (represented by bullets and subfolder icons) of event classes. Some of these instances (e.g., those associated with a subfolder icon) are also event classes and may in turn contain additional instances and classes. In the depicted embodiment, the first sense of the lemma "convey" has been chosen as an event class 22 and the instances 24 comprising lemmas (and senses of the lemmas), troponyms and hyponyms of the event class 22 are shown. When a word and sense is observed in the textual content which is an event class (e.g., convey(1)), then the annotation may be the event class (e.g., covey (1)). When a word and sense is observed in the textual content which is an instance (e.g., grimace(1)), then the annotation may be the respective event class of the instance (e.g., covey (1)). As described further below, individual ones of the event classes 22 may be used to disambiguate the occurrence of respective instances which are found to occur in textual content being analyzed.

Referring to FIG. 4, a method of analyzing textual content is shown according to one embodiment. The method of FIG. 4 may be implemented using processing circuitry 14 of computing system 10 in one implementation. The illustrated exemplary method may be used to disambiguate the textual content in one embodiment. Disambiguation may refer to provision of a label or annotation which more clearly indicates the meaning of one or more words in a document and/or the meaning of the document itself. For example, disambiguation may include identifying a specific sense of a word (as opposed to merely the word itself) corresponding to the context in which the word is used and/or providing a more general, less specific meaning of one or more words of a document and/or the document itself. Other methods are possible including more, less and/or alternative steps.

Initially, at a step S30, a lexical database ontology is accessed. An exemplary method of determining an appropriate ontology is described above with respect to FIG. 2 and a fragment of an exemplary ontology is shown in FIG. 3. A lexical database ontology which may be used for analysis of textual content may include a plurality of event classes and respective instances which correspond to the event classes in one embodiment.

At a step S32, textual content to be analyzed may be accessed. In one example, the textual content may include one or more text items (e.g., documents, articles, correspondence, speech transcriptions, etc.) or other arrangements of textual content. Analysis of the textual content may be performed to disambiguate the subject matter of the textual content. At least some of the words of the textual context may include a plurality of senses which cause ambiguation as to the words' meanings. The disambiguation may facilitate searching of the textual content, increase the accuracy of search results compared with no disambiguation, facilitate analysis to associate a plurality of documents with one another (e.g., cluster documents using In-Spire ™) and/or improve the accuracy of association of documents.

At a step S34, word senses of the words of the textual content accessed in step S32 are determined. In one embodiment, classification models (also referred to as classifiers) may be used to identify the senses of the words. The following discussion with respect to classification models pertains to analysis of verbs but may also be applied to nouns, adverbs, or adjectives.

Classification models may be created for verbs of the English language in one embodiment. In a more specific exemplary embodiment, for each verb lemma, a classification model may be defined which predicts the sense of a verb of the textual content being analyzed according to the context of the content in which the verb lemma occurs.

In one embodiment, classification models may be defined using a training corpus of documents. In one example for defining classification models for use in analyzing documents of general subject matter, a SemCor training corpus discussed at http://www.cs.unt.edu/~rada/downloads.html may be used. An OpenNLP MaxEnt implementation (http://maxent.

sourceforge.net) of a maximum entropy classification algorithm described at Berger, A., S. Della Pietra and V. Della Pietra (1996) A Maximum Entropy Approach to Natural Language Processing. *Computational Linguistics*, volume 22, number 1, pages 39-71, may be used to define the classification models in one embodiment. The teachings of the references cited in this paragraph are incorporated by reference.

In one embodiment, contextual, syntactic and semantic information may be used to train and define classification models in one embodiment. Contextual information may be obtained in one example by including three tokens on each side of a verb lemma of a training corpus under analysis wherein the tokens do not cross sentence boundaries. Tokens may include word tokens as well as punctuation. Syntactic information includes grammatical dependencies (e.g., subject, object) and morphosyntactic features such as part of speech, case, number and tense. In one embodiment, a parser may be used to extract syntactic information. Details of one exemplary parser which may be used are described at Tapanainen, P. and Timo Järvinen (1997) *A Nonprojective Dependency Parser*, In Proceedings of the 5th Conference on Applied Natural Language Processing, pages 64-71, Washington D.C. Association for Computational Linguistics and www.connexor.com, the teachings of which are incorporated herein by reference. A sample output of a Connexor parser for a sentence "The engine throbbed into life." is shown in Table 1.

TABLE 1

| ID# | Word | Lemma | Grammatical Dependencies | Morphosyntactic Features |
|---|---|---|---|---|
| 1 | the | The | det: >2 | @DN > % > N DET |
| 2 | engine | engine | subj: >3 | @SUBJ % NH N NOM SG |
| 3 | throbbed | throb | main: >0 | @+FMAINV % VA V PAST |
| 4 | into | into | goa: >3 | @ADVL % EH PREP |
| 5 | life | life | pcomp: >4 | @<P % NH N NOM SG |
| 6 | . | . | | |

As mentioned above, semantic information may also be used to define the classification models. Semantic information includes named entity types (e.g., person, location, organization) and hypernyms. In one embodiment, LCC's Cicero Lite described at http:www.languagecomputer.com/solutions/information_extraction/cicero_lite, the teachings of which are incorporated herein by reference, may be used to extract named entity types and replace strings identified as named entities (e.g., Joe Smith) with corresponding entity types (e.g., PERSON). Hypernyms may be retrieved from WordNet 2.0 in the described example. In one embodiment, only the hypernyms of sence 1 of lemmas are expanded but an entire hypernym chain (e.g., motor, machine, device, instrumentality, artifact, object, whole, entity) may be included.

Additional details of usage of contextual, syntactic and/or semantic information are described in Dang, H. T. and M. Palmer *The Role of Semantic Roles in Disambiguating Verb Senses*, Proceedings of the 43 Annual Meeting of the Association for Computational Linguistics, Ann Arbor, Mich., Jun. 26-28, 2005, and Kohomban, U. and W. Lee (2005) *Learning Semantic Classes For Word Sense Disambiguation*, Proceedings of the 43rd Annual meeting of the Association for Computational Linguistics, Ann Arbor Mich., the teachings of which are incorporated by reference. An example of a sample of resulting feature vectors which were both for training and recognition is provided in Table 2.

TABLE 2

| | |
|---|---|
| The | pre:2:the, pre:2:pos:DET, det:the, det:pose:DET, hassubj:det: |
| engine | pre:1:instrumentally, pre:1:object, pre:1:artifact, pre:1:device, pre:1:engine, pre:1:motor, pre:1:whole, pre:1:entity, pre:1:machine, pre:1:posN:, pre:1:case:NOM, pre:1:num:SG, subj:instrumentality, subj:object, subj:artifact, subj:device, subj:engine; subj:motor, subj:whole, subj:entity, subj:machine, subj:pos:N, hassubj:, subj:case:NOM, subj:num:SG |
| throbbed | haspre:1:, haspre:2:, haspost:1:, haspost:2:, haspost:3:, self:throb, self:pos:V, main:, throbbed, self:tense:PAST |
| Into | Post:1:into, post:1:pos:PREP, goa:into, goa:pos:PREP, |
| Life | post:2:life, post:2:state, post:2:being, post:2:pos:N, post:2:case:NOM, post:2:num:SG, hasgoa:, pcomp:life, pcomp:state, pcomp:being, pcomp:pos:N, hasgoa:pcompp:, goa:pcomp:case:NOM, goa:pcomp:num:SG |
| . | post:3:. |

As the example of Table 2 indicates, combination of contextual, syntactic and semantic information types may result in a relatively large number of features. A feature selection procedure may be used to reduce a final feature set to a feature subset that is most relevant to verb class assignment for each verb lemma (e.g., some of the features may be noise for any particular lemma). One procedure is to score each potential feature according to a particular feature selection metric and to use the best k features. In one embodiment, an Information Gain selection metric, measuring the decrease in entropy when the feature is given versus absent may be used. Details regarding this procedure are discussed in Yang, Y. and J. O. Pedersen (1997) *A Comparative Study on Feature Selection in Text Categorization*, In Proceedings of the 14th International Conference on Machine Learning (ICML), pages 412-420; and Forman, G. (2003) an *Extensive Empirical Study of Feature Selection Metrics for Text Classification*, Journal of Machine Learning Research 3, pages 1289-1305, the teachings of which are incorporated herein by reference. It is believed that feature selection may be improved by developing a best subset selection procedure based on Information Gain by scoring subsets of features simultaneously rather than individual features thereby identifying high value feature combinations.

For noun disambiguation, different sets of features may be selected. For a noun under analysis, features may be selected as the noun and three tokens found on each side of the noun within sentence boundaries and all verbs within sentence boundaries (e.g., tokens may include words and punctuation), morphological information about all tokens chosen (e.g., part of speech, case, number), syntactic dependency of the noun, an indication of what dependents the noun has (e.g., "hasDet"), a specification of what verb is related to the noun, the syntactic dependency of the words dependent on the noun (e.g., 'det:the'), and the hypernym chain of all nouns selected. Other methods may be used to select features of nouns in other embodiments.

Once the classification models are created for the respective words or lemmas, the words of the textual content are analyzed with respect to the classification models in an attempt to determine which of the senses of the words are appropriate corresponding to the context in which the words or lemmas are used in the textual content. The words of the textual content may be parsed, for example using a Connexor or other suitable parser. The parsed output may be processed as described above with respect to the creation of the classification model which identifies feature vectors for the words or lemmas. Thereafter, the procedure may match groups of features (e.g., feature vectors) of the word or lemma of the textual content with a closest one of the groups of features of the classification model for the word or lemma. The sense of the word or lemma associated with the selected or matched group of features may be selected as the sense for the word or lemma.

Referring again to FIG. 4, at a step S36, the accessed lexical database ontology may be used to identify the event classes for the respective words or lemmas. For example, the senses of the words or lemmas of the textual content identified in step S34 may be used to address the ontology and the event classes to which the words or lemmas and senses belong as instances may be used to disambiguate the words of the textual content. In some situations, one word (or lemma) and the respective sense thereof may result in the identification of two event classes wherein either of the two event classes may be used.

At a step S38, an annotation may be created using the identified event classes and the annotation associated with the textual content. The annotation may include the event classes which were identified for the respective words or lemmas of the textual content and the event classes provide disambiguated meanings of the words or lemmas of the textual content in one exemplary embodiment. As discussed above, an event class may include a word or word lemma and the respective sense thereof corresponding to the respective event class and which provides a more clear and/or generic meaning of the word or lemma being disambiguated in the textual content.

The method of FIG. 4 may be performed to disambiguate (e.g., annotate) every lemma or word of the textual content in one implementation. In other embodiments, disambiguation may only be performed with respect to some of the word contents of the textural content and/or common words (e.g., "and," "the," "or," etc.) may be omitted.

Referring to FIG. 5, an exemplary disambiguation method is illustrated according to one embodiment. The method of FIG. 5 may be implemented using processing circuitry 14 of computing system 10 in one implementation. Other methods are possible including more, less and/or alternative steps.

In at least some of the above-described embodiments, accuracy of word sense disambiguation depends on the word sense annotations found in the training corpus and the lexical database ontology. Accordingly, the nature and quality of the corpus used to create classification models or different ontologies may impact the results of the disambiguation. The method of FIG. 5 describes the provision of a plurality of different ontological annotation models and/or word sense disambiguation models which may be used for disambiguation, and the selection of one of the ontological annotation models and/or word sense disambiguation models corresponding to the subject matter domain or topical content (e.g., general English, medical, biology, sports, etc.) of the textual content being analyzed.

The different word sense disambiguation models may include a plurality of different classifiers or classification models which may be generated using the teachings described above. However, the training corpus of documents may be changed during the training of the classification models corresponding to the word sense disambiguation models being generated. More specifically, in one embodiment, different types of classification models may be generated by different types of training corpus and corresponding to different subject matter domains of textual content to be analyzed. For example, if textual content to be analyzed concerns medicine, biology or sports, different classification models may be trained using medicine, biology or sports related training corpora, respectively, to increase the accuracy of the resultant analysis. According to additional aspects, corpora of different subject matter domains may be used to define a plurality of lexical database ontologies. For example, at step S12 of FIG. 2, different corpora may be used which relate to different domains to create a plurality of ontologies corresponding to the respective domains. Thereafter, the different lexical database ontologies may be used to disambiguate textual content relating to different subject matter domains, respectively.

FIG. 5 illustrates one exemplary method of selecting from the plurality of lexical database ontologies and/or word sense disambiguation models (and the classification models associated therewith) which may be used for disambiguation based upon the topical content or subject matter domain of the textual content being analyzed in one embodiment.

At a step S40, textual content to be analyzed may be accessed. The textual content may be the same as the textual content described above with respect to step S30 of FIG. 4 in one embodiment.

At a step S42, the topical content or subject matter domain of the textual content being analyzed is determined. In one embodiment, text categorization techniques may be utilized to sort a set of documents into categories from a predefined set. During text categorization preparation, a training set for each domain of interest (e.g., general English, medical, sports, etc.) may be generated. Further, a text categorization model may be developed that, for each input text, predicts to which domain the input text belongs to. Using the text categorization model, the domain which is most appropriate for the topical content of the textual content being analyzed is identified. Finally, word sense disambiguation models (e.g., classification models) may be generated for each of the domains. Additional details of text categorization modeling are described in Fabrizio Sebastiani (2002) *Machine Learning In Automated Text Categorzation*, ACM Computing Surveys, volume 34, number 1, pages 1-47, available at http://www.math.unipd.it/~fabseb60/Publications/ACMS02.pdf, the teachings of which are incorporated herein by reference.

At a step S44, the results of the domain prediction of step S42 may be used to predict which of the lexical database ontologies and/or word sense disambiguation models should be utilized for disambiguating the textual content being analyzed.

At a step S46, the textual content may be disambiguated and annotated using the selected lexical database ontology and/or classification models of the selected word sense disambiguation model.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. A computer-implemented method of defining a lexical database ontology comprising:
   accessing a lexical database comprising a plurality of concepts individually including a plurality of different words;
   accessing a corpus of documents;
   using a processor, identifying occurrences of the words in the documents of the corpus;
   using the processor, counting a plurality of frequency counts for the concepts, wherein the counting includes incrementing the frequency counts of the concepts using the identifying of the occurrences of the words of the respective concepts in the documents;

using the processor, analyzing the frequency counts;
using the processor, selecting a plurality of the concepts as event classes of a lexical database ontology using the analyzing, wherein the event classes of the lexical database ontology are usable to disambiguate textual content; and
wherein each concept includes a sense of a word lemma, and wherein the counting for one of the concepts comprises incrementing the frequency count of the one concept, for each occurrence of the word lemma in the documents of the corpus which is included in the one concept, by 1/n where n is the total number of concepts which include a sense of the world lemma.

2. The method of claim 1 wherein the concepts individually comprise a synonym set comprising a plurality of synonyms related to the individual concept.

3. The method of claim 1 wherein the concepts individually include the respective different words comprising verbs.

4. The method of claim 1 wherein the concepts individually include a plurality of senses for respective ones of the different words of the individual concept.

5. The method of claim 1 wherein the analyzing comprises comparing the frequency counts with respect to a threshold and the selecting comprises selecting the concepts whose frequency counts exceed the threshold.

6. The method of claim 1 wherein the incrementing comprises incrementing the frequency counts of concepts which are hypernyms of concepts whose frequency counts have been incremented.

7. The method of claim 1 wherein the selecting comprises selecting only concepts which include words which comprise hyponyms.

8. The method of claim 1 further comprising defining instances of the event classes, wherein the defining comprises for an individual one of the concepts, defining the instances to comprise words of the concepts and troponyms of the words of the concepts for the individual one of the concepts.

9. The method of claim 8 wherein the instances comprising words additionally comprise the senses of the words.

10. The method of claim 1 further comprising, for an individual one of the event classes, selecting one of the words of the respective concept of the event class as the name of the respective event class for use in disambiguation of instances of the event class.

11. The method of claim 10 wherein the selecting the one of the words comprises selecting the one of the words having the highest frequency of occurrence in the documents.

12. The method of claim 10 wherein the accessing the lexical database comprises accessing a version of WordNet.

13. An article of manufacture comprising:
non-transistory media storing programming configured to cause processing circuitry to perform processing comprising:
accessing a lexical database comprising a plurality of concepts individually including a plurality of different words;
selecting a plurality of the concepts as event classes of a lexical database ontology, wherein the event classes of the lexical database ontology are usable to disambiguate textual content;
accessing a corpus of documents;
identifying occurrences of the words in the documents of the corpus;
counting a plurality of frequency counts for the concepts, wherein the counting includes incrementing the frequency counts of the concepts as a result of the identifying of the occurrences of the words of the respective concepts in the documents;
analyzing the frequency counts, and wherein the selecting comprises selecting using the analyzing; and
wherein each concept includes a sense of a word lemma, and wherein the counting for one of the concepts comprises incrementing the frequency count of the one concept, for each occurrence of the word lemma in the documents of the corpus which is included in the one concept, by 1/n where n is the total number of concepts which include a sense of the world lemma.

14. The article of claim 13 wherein the processing further comprises defining instances of the event classes, wherein the defining comprises for an individual one of the concepts, defining the instances to comprise words of the concepts and troponyms of the words of the concepts for the individual one of the concepts.

15. The article of claim 14 wherein the instances comprising words additionally comprise the senses of the words.

16. The article of claim 13 wherein the processing further comprises, for an individual one of the event classes, selecting one of the words of the respective concept of the event class as the name of the respective event class for use in disambiguation of instances of the event class.

17. The method of claim 1 wherein the event classes of the lexical database ontology are usable to disambiguate the textual content of text to be analyzed subsequently after the defining the lexical database ontology including the selecting the concepts as event classes of the lexical database ontology.

18. The article of claim 13 wherein the textual content to be disambiguated comprises a plurality of text items which individually comprise a plurality of words.

\* \* \* \* \*

UNITED STATES PATENT AND TRADEMARK OFFICE
CERTIFICATE OF CORRECTION

PATENT NO. : 8,036,876 B2  
APPLICATION NO. : 11/267370  
DATED : October 11, 2011  
INVENTOR(S) : Antonio Sanfilippo et al.

Page 1 of 1

It is certified that error appears in the above-identified patent and that said Letters Patent is hereby corrected as shown below:

Title Page, (56) References Cited – Replace in Benassi reference "Chaining" with --Chalning--

Title Page, (56) References Cited – Replace in Montoyo reference "200" with --2002--

Title Page, (56) References Cited – Replace in Resnik reference "Artificer" with --Artificial--

Title Page, (56) References Cited – Replace in OWL reference "http:/www.w3.org/TR/owl-ref" with --http://www.w3.org/TR/owl-ref--

Title Page, (56) References Cited – Replace in Sanfilippo reference "Disabiguation" with --Disambiguation--

In the Specifications:

Column 4, line 62 – Replace "BNCFreg.pl" with --BNCFreq.pl--

Column 7, line 46 – Replace "http:www.languagecomputer.com/solutions/information_extraction/cicero_lite" with --http://www.languagecomputer.com/solutions/information_extraction/cicero_lite--

Signed and Sealed this  
Fourth Day of June, 2013

Teresa Stanek Rea  
*Acting Director of the United States Patent and Trademark Office*